US011565466B2

(12) United States Patent
Hutchinson

(10) Patent No.: US 11,565,466 B2
(45) Date of Patent: Jan. 31, 2023

(54) SURFACE EQUALIZATION APPARATUS

(71) Applicant: PostProcess Technologies, Inc., Buffalo, NY (US)

(72) Inventor: Daniel Joshua Hutchinson, Lancaster, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 367 days.

(21) Appl. No.: 15/638,898

(22) Filed: Jun. 30, 2017

(65) Prior Publication Data

US 2019/0022931 A1 Jan. 24, 2019

Related U.S. Application Data

(60) Provisional application No. 62/356,751, filed on Jun. 30, 2016.

(51) Int. Cl.
| | |
|---|---|
| *B29C 64/35* | (2017.01) |
| *B29C 64/188* | (2017.01) |
| *B29C 64/00* | (2017.01) |
| *B29C 64/232* | (2017.01) |
| *B29C 64/236* | (2017.01) |

(Continued)

(52) U.S. Cl.
CPC ............ *B29C 64/188* (2017.08); *B29C 64/00* (2017.08); *B29C 64/106* (2017.08); *B29C 64/232* (2017.08); *B29C 64/236* (2017.08); *B29C 64/241* (2017.08); *B29C 64/35* (2017.08);

(Continued)

(58) Field of Classification Search
CPC ..... B29C 64/188; B29C 64/232; B29C 64/00; B29C 64/236; B29C 64/241; B29C 64/35; B29C 64/106; B33Y 10/00; B33Y 30/00; B33Y 64/40
See application file for complete search history.

(56) References Cited

U.S. PATENT DOCUMENTS

| | | |
|---|---|---|
| 2,973,606 A | 3/1961 | Brandt |
| 4,143,491 A | 3/1979 | Blanc |
| (Continued) | | |

FOREIGN PATENT DOCUMENTS

| | | |
|---|---|---|
| CA | 2952633 A1 | 12/2015 |
| CH | 405098 A | 12/1965 |
| (Continued) | | |

*Primary Examiner* — Sharidan Carrillo
(74) *Attorney, Agent, or Firm* — Hodgson Russ LLP

(57) ABSTRACT

A surface equalization apparatus designed to be compatible with a wide variety of part technologies, composite materials and part geometries. The apparatus works with software, chemistry, abrasives and media and includes an oblong, elongated input tank for holding media and a part. The input tank is connected to a motor mount, which is connected to an eccentric motor. When the motor is activated, the input tank begins to move in a vibrational, sinusoidal manner. The motion of the tank on attached springs generates a rotational flow of media in the tank. This creates a low amplitude/high frequency movement of the part through the tank. Surface structures divert media to prevent the part from contacting the side of the tank. Spray nozzles are positioned above the input tank. Acoustic damping foam is positioned around the central components. A cooling fan allows airflow through the apparatus.

18 Claims, 5 Drawing Sheets

(51) Int. Cl.
  *B29C 64/241*  (2017.01)
  *B29C 64/106*  (2017.01)
  *B29C 64/40*  (2017.01)
  *B33Y 10/00*  (2015.01)
  *B33Y 30/00*  (2015.01)

(52) U.S. Cl.
  CPC .............. *B29C 64/40* (2017.08); *B33Y 10/00* (2014.12); *B33Y 30/00* (2014.12)

(56) References Cited

U.S. PATENT DOCUMENTS

| | | | |
|---|---|---|---|
| 4,499,692 A | 2/1985 | Balz | |
| 4,693,037 A * | 9/1987 | McNeil | B24B 31/073 |
| | | | 134/132 |
| 4,716,684 A * | 1/1988 | Roach | B24B 31/064 |
| | | | 451/104 |
| 5,143,663 A | 9/1992 | Leyden et al. | |
| 5,248,456 A * | 9/1993 | Evans, Jr. | B08B 3/12 |
| | | | 264/401 |
| 5,490,882 A * | 2/1996 | Sachs | B08B 3/10 |
| | | | 134/1 |
| 5,814,161 A * | 9/1998 | Sachs | B08B 3/10 |
| | | | 134/21 |
| 6,270,398 B1 | 8/2001 | Liao | |
| 8,459,280 B2 * | 6/2013 | Swanson | B08B 3/104 |
| | | | 134/184 |
| 10,737,440 B2 * | 8/2020 | Hutchinson | B08B 3/102 |
| 2003/0084915 A1 * | 5/2003 | Trahan | B08B 3/02 |
| | | | 451/36 |
| 2005/0173838 A1 | 8/2005 | Priedeman et al. | |
| 2008/0041700 A1 | 2/2008 | Potterfield et al. | |
| 2009/0321972 A1 * | 12/2009 | Zinniel | B29C 71/0009 |
| | | | 264/37.13 |
| 2011/0186081 A1 | 8/2011 | Dunn et al. | |
| 2015/0140295 A1 * | 5/2015 | Okamoto | B33Y 10/00 |
| | | | 428/206 |
| 2015/0209836 A1 | 7/2015 | Dunn et al. | |
| 2015/0251291 A1 | 9/2015 | Hovik | |
| 2015/0367415 A1 * | 12/2015 | Buller | B33Y 70/00 |
| | | | 419/53 |
| 2016/0074911 A1 * | 3/2016 | Dore | B08B 3/006 |
| | | | 134/56 R |
| 2016/0074940 A1 * | 3/2016 | Cote | B33Y 99/00 |
| | | | 134/23 |
| 2019/0022931 A1 * | 1/2019 | Hutchinson | B29C 64/188 |

FOREIGN PATENT DOCUMENTS

| | | |
|---|---|---|
| JP | H02237761 A | 9/1990 |
| JP | 2010131675 A | 6/2010 |

* cited by examiner

SURFACE EQUALIZATION APPARATUS

CROSS-REFERENCE TO RELATED APPLICATIONS

This application claims the benefit of provisional application No. 62/356,751, which was filed on Jun. 30, 2016.

TECHNICAL FIELD

The present disclosure pertains generally to an apparatus for surface finishing a part formed by 3D printing and enhancing mechanical properties of the part.

BACKGROUND 3D printing often results in a printed part having an uneven surface. For example, fused deposition modeling (FDM) is a 3D printing technology commonly used for modeling, prototyping, and production applications. FDM works on an "additive" principle by laying down material in layers; a plastic filament or metal wire is unwound from a coil and supplies material to produce a part. This process may result in a "layered" surface, where individual steps associated with each layer progress in an overall direction. Such a surface may not be suitable for some application areas where a more sophisticated finish is desired. Additive manufacturing and 3D printing methods are not limited to those disclosed herein.

Due to the layered appearance and/or porosity of the body of a part produced by 3D printing, it may be desirable to equalize the surface of the part both internally and externally to give it a more finished appearance and improve function. Although the field is relatively new, methods of producing a finished appearance in a 3D printed part are known in the art. These include the use of adhesive film that is applied to the surface of the 3D printed part that bonds to the part and gives the appearance of an enhanced surface. Other methods include the use of solvents that erode the surface of the part to provide a smooth finish.

The drawbacks of the known systems are numerous, including limitations caused by incompatibility with a variety of materials and shapes. In existing systems, much experimentation may be required to discover the appropriate abrasive, adhesive, and/or solvent for each part.

Effective and efficient surface finishing for a wide variety of 3D printed materials and part shapes and sizes requires a system that is universally applicable. Therefore, a need exists for a surface equalization apparatus that can accommodate the wide and expanding variety of part types encountered in the fast-growing field of 3D printing and additive manufacturing.

SUMMARY

In the present disclosure, a solution to the problems of existing surface finishing methods and devices is provided through a surface equalization apparatus designed to be compatible with a wide variety of technologies, including FDM, PolyJet, DMLS, CBAM and the like, along with various composite materials and part geometries. The present disclosure describes a surface equalization apparatus that has a novel design and works together with software, abrasive and polishing materials and detergent for a synergistic effect on improving efficiency and effectiveness in surface finishing.

The surface equalization apparatus of the present disclosure includes an oblong input tank for holding media and a 3D printed part. The outer portion of the input tank is connected to a motor mount, which, in turn, is connected to an eccentric motor. When the motor is activated, the input tank begins to move in a vibrational manner, in a z direction. The input tank is attached to springs, generally adjacent the top, outer portion of the tank and the motion of the tank on the springs creates a rotational flow of media in the input tank. This rotational flow of media creates a consistent and calibrated low amplitude/high frequency movement of the part through the tank.

The rotational flow of the media works in conjunction with structures on the inside of the input tank, which include diverters and guide ribs. These structure help prevent the part from contacting the side of the tank and causing damage to the part. Media is replenished in the input tank through a set of spray nozzles positioned at intervals above the media in the input tank, and connected to a washer tank which supplies fresh media. Acoustic damping foam is positioned around the central components of the surface equalization apparatus. A cooling fan is integral with a side of a cabinet to allow air flow through the apparatus.

BRIEF DESCRIPTION OF THE DRAWINGS

Preferred embodiments of the present invention will now be described, by way of example only, with reference to the attached Figures, wherein.

DETAILED DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention.

Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention.

Figure 1:
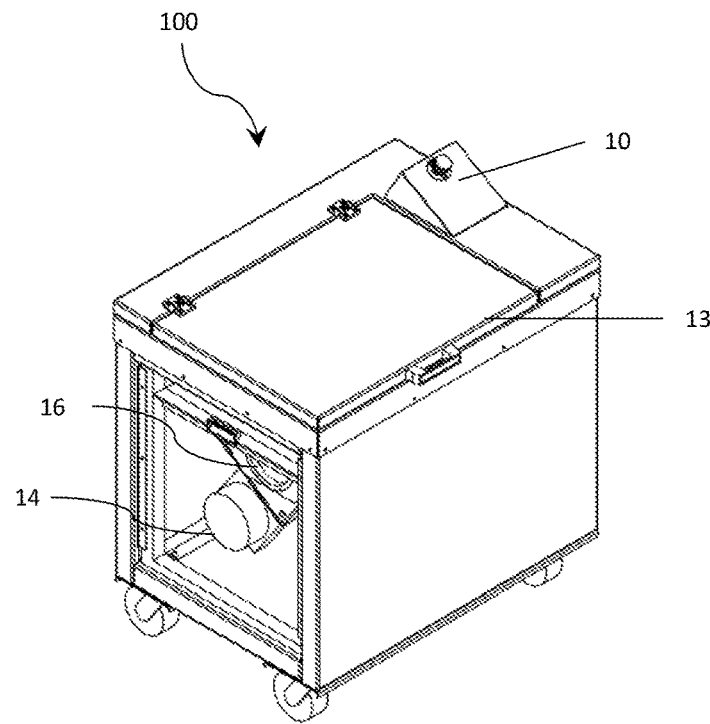
FIG. 1 shows a top perspective view of the surface equalization apparatus in accordance with the present disclosure.

Referring now to FIG. 1, an embodiment of a surface equalization apparatus 100 in accordance with the present invention is shown. Surface equalization apparatus 100 may be used for finishing relatively large 3D parts. Lid 13 opens to allow placement of a 3D printed part in a media 44 (shown in FIG. 5) held in input tank 16. Input tank 16 may be preferably comprised of urethane. Control panel 10 allows a user to input initial pre-determined parameters such as time and motor speed. Eccentric motor 14 is shown below input tank 16. Eccentric motor 14 is attached to input tank 16 such that when eccentric motor 14 is powered on, it causes input tank 16 to vibrate in a manner that results in surface equalization, or surface finishing. In some embodiments two eccentric motors 14 may be used side by side and/or on opposite sides on input tank 16.

Figure 2:
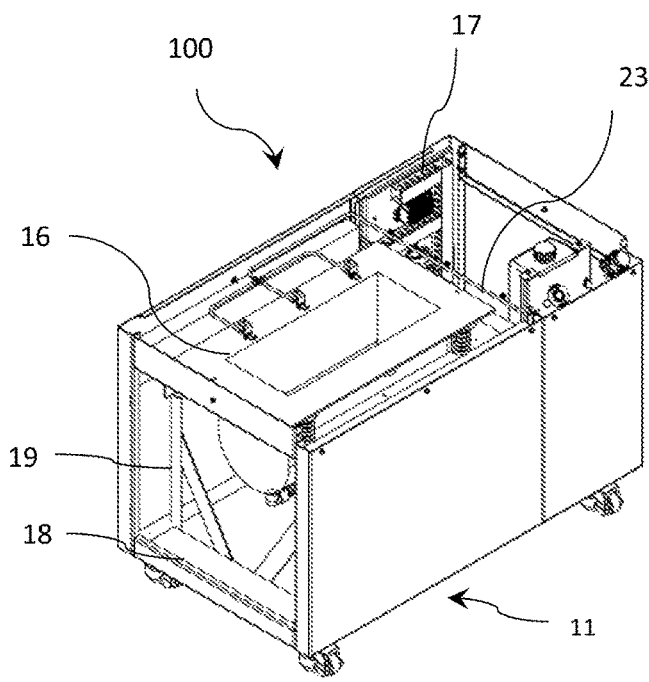
FIG. 2 shows a top perspective view of the surface equalization apparatus in accordance with the present disclosure.

Referring now to FIG. 2, finisher chassis 19 surrounds input tank 16 and provides structural support for surface equalization apparatus 100. Acoustic damping foam 18 is shown adjacent finisher chassis 19. Electronics panel 28 (shown in FIG. 3) controls operations for surface equalization apparatus 100.

Figure 3:
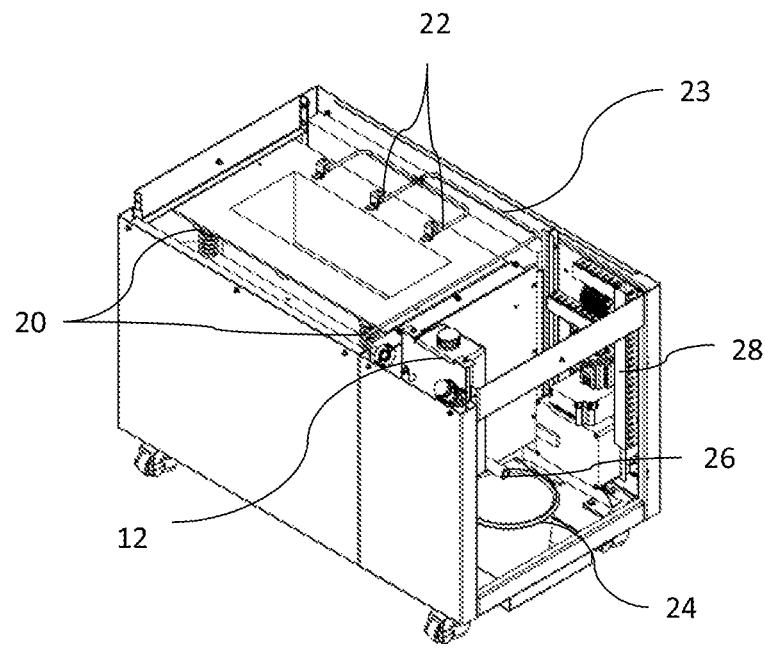
FIG. 3 shows a top perspective view of the surface equalization apparatus in accordance with the present disclosure.

Referring now to FIG. 3, wastewater removal bucket 24 provides a means for separation of liquid from solid waste after wastewater leaves wastewater outlet 26. Washer tank 12 contains media 44 for dispensing into input tank 16 through spray nozzles 22, which are connected to washer tank 12 through spray nozzle piping 23.

Spray nozzle 22 flow range is important for the present disclosure, such that in order to maximize the lubricity of the media these nozzles are evenly spaced to mist or spray into the chamber to create a homogeneous mixture. In a preferred embodiment, three spray nozzles 22 are spaced evenly at a top edge of input tank 16. The position of the nozzles is fixed to point directly at the media 44 in input tank 16. The flow rate of media 44 exiting spray nozzles 22 may be determined by onboard computer. Washer tank 12 is shown adjacent to input tank 16 to feed the spray valves.

Figure 4:
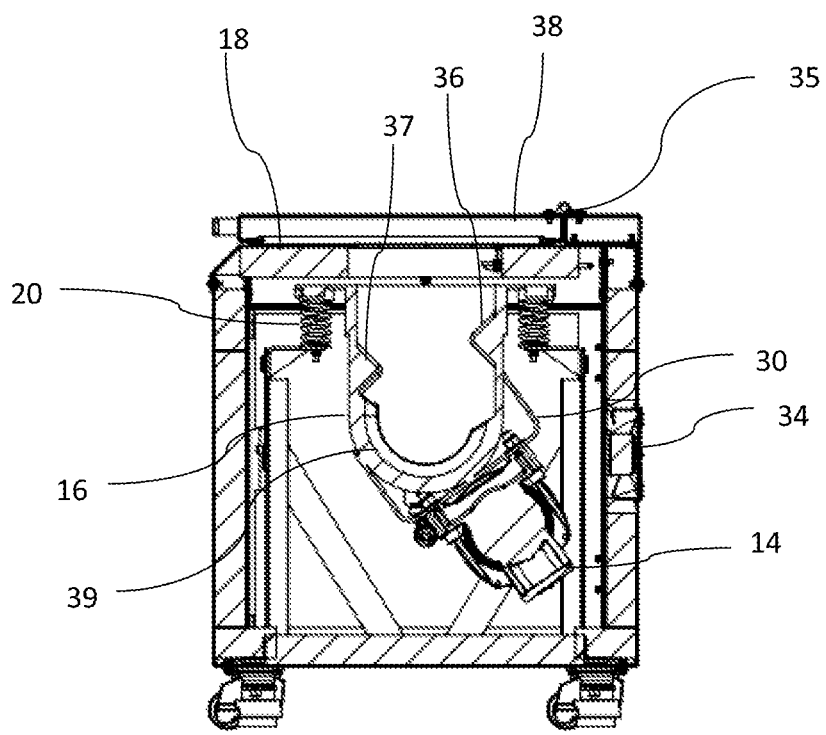
FIG. 4 shows a cross-sectional side view of the surface equalization apparatus in accordance with the present disclosure.
Figure 5:
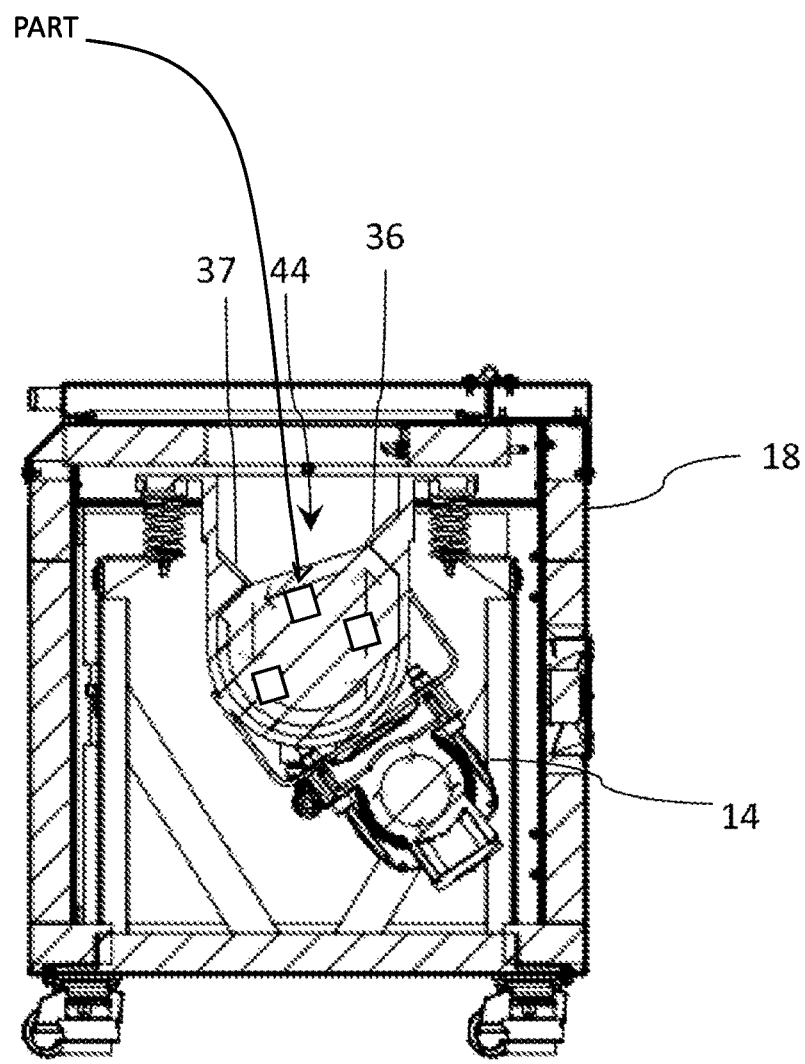
FIG. 5 shows a cross-sectional side view of the surface equalization apparatus including a visualization of the direction of media in accordance with the present disclosure.

Referring now to FIGS. 4 and 5, cross-sectional side views of the present disclosure shows eccentric motor 14 offset from a vertical axis running through the center of input tank 16. As shown in FIG. 5, eccentric motor 14 rotates to cause vibrational motion of the U-shaped, oblong input tank 16. Motor mount 30 allows the vibrational energy generated by eccentric motor 14 to be transferred to input tank 16 and media 44. Eccentric motor 14 rotates in the opposite direction of the rotational flow of media 44. Eccentric motor 14 has an applied angle to allow for the feed and discharge rate of the part in continuous motion. The angle of the eccentric motor 14 may be offset to 30° relative to a vertical axis in the preferred embodiment, although the angle may vary based on parameters of the part and surface equalization apparatus 100. Media 44 is at an angle during operation of the apparatus (see Table 1 for relationships between media and other aspects of surface equalization machine 100). When a part reaches a complete cycle it goes through a slope phase, traveling from peak amplitude at a discharge, or exhaust, portion down to an intake portion. The machine is designed and calibrated to maintain the part below the surface of media 44 at all times.

As shown in FIG. 4, a key functional feature of the present disclosure is use of an eccentric motor 14 that causes springs 20 attached to the input tank 16 to move in a z-direction motion (or a bounce). Input tank 16 is suspended on springs 20, which control a force applied by eccentric motor 14, resulting in a z-direction, or vertical, motion on the order of 1-3 millimeters, in a preferred embodiment.

Eccentric motor 14 is positioned tangential to input tank 16 on motor mount 30. Eccentric motor 14 spins, causing a frequency of motion that is harnessed to an up and down motion in the springs 20 attached to input tank 16. The tension of the springs 20 generates a lifting motion.

Placing springs 20 at the top portion of input tank 16 creates a more stable system than having the springs 20 below input tank 16, although it is possible that an effective system could be designed with the springs 20 below input tank 16. Alignment of springs 20 to a metacentric height and the center of gravity, with respect to input tank 16, is an important aspect of the present disclosure, and creates stable dynamic motion. A metacenter is defined as the point of intersection between a vertical line through the center of buoyancy of a floating body such as a ship and a vertical line through the new center of buoyancy when the body is tilted, which must be above the center of gravity to ensure stability. The metacentric height (GM) is a measurement of the initial static stability of a floating body. It is calculated as the distance between the center of gravity of a ship and its metacenter. A larger metacentric height implies greater initial stability against overturning. The motion center of the fluid mass abrading the surface the part in motion.

Eccentric motor 14 is calibrated to the combined mass of input tank 16, eccentric motor 14, and the media 44 contained in input tank 16. The power ratio may be as follows: for every pound of mass (input tank 16, media 44 contained in input tank 16, and eccentric motor 14 combined), approximately 5.57 pounds of force is applied by eccentric motor 14. For example, the range of force to weight may be approximately 4:1 to 7:1. The surface equalization apparatus 100, in one embodiment used for larger 3D parts, may, for example, apply 1659 lbf to a weight of 298 lbs.

As shown in FIG. 5, media 44 flows rotationally, here illustrated in a counterclockwise direction, in response to activation of eccentric motor 14, which rotates in the opposite direction of the rotational flow of media 44; here clockwise. While media 44 rotates, it carries a part to in a cycle through input tank 16. Media 44 has a sloped, generally flat, surface during operation of surface equalization apparatus 100. The effect on the part is delicate in nature with surface equalization apparatus 100 when compared to conventional surface finishing devices due to the low amplitude/high frequency ratio motion of the part. The part moves in a symmetrical, submerged, circuitous motion. The motion of the springs 20 causes the input tank 16 to move generally in a z-direction. This motion causes the part to be agitated within the media 44 containing abrasives and detergent, thereby generating heat energy and allowing complete immersion of the part such that all surfaces of the part receive consistent and simultaneous abrasion in a manner that effectively causes surface equalization.

Further, media 44 is formulated to avoid damage to delicate parts and keep the part below the surface of media 44 and away from solid portions of input tank 16. The surface equalization apparatus 100, in a preferred embodiment, may be effective for low density media/low density part surface equalization. Input tank 16 holds media 44 designed specifically for use in surface finishing.

FIGS. 4 and 5 show abrasive diverters, which include an exhaust diverter 36 and an intake diverter 37, which modify the shape of the input tank 16. Abrasive diverters are attached to the wall, or incorporated into the wall, of input tank 16 to modify the shape of the input tank 16 and may be preferably comprised of urethane. Abrasive diverters create directional energy transference, as exhaust diverter 36 and intake diverter 37 are energy dissipaters. In a preferred embodiment, exhaust diverter 36 and intake diverter 37 are positioned on opposing walls of input tank 16, at the surface of media 44. In some embodiments, only one abrasive diverter may be used. It is conceivable that no abrasive diverters would be necessary for certain applications.

As shown in FIG. 5, abrasive diverters are angled to properly direct the flow of media 44 in the input tank 16. The abrasive diverters may be triangular in shape, and jut inward to direct media 44 flow so as to prevent the part from reaching the surface. The abrasive diverter is turning the part at the crest so that when the part is on the intake side there is fluid movement around the part. The abrasive diverter prevents the part from riding down the bed of media 44 on the surface, and maintains the part in a desirable position underneath the media 44 surface.

Optimal cubic foot of media 44 determines where the intake diverter 37 would be. The crest of each abrasive diverter may be, in a preferred embodiment, an inch above the slope of the surface of media 44, or may also be approximately at the surface of media 44.

FIG. 4 shows guide ribs 39, which generally extend from one side of input tank 16 to the other. Guide ribs 39 may be semi cylindrical in shape and be spaced evenly longitudinally across input tank 16 and preferably be comprised of urethane. In a preferred embodiment there may be five guide ribs 39 in input tank 16, and spaced evenly at a rate of seven guide ribs 39 per square cubic foot. Guide ribs 39 may preferably be ¼" to 5" in width and ¼" to 3" in depth. Guide ribs 39 create an inward force toward the center of input tank 16 on media 44 when eccentric motor 14 is powered on, thereby preventing the part from contacting the surface of input tank 16, thereby preventing damage to the part.

The media 44 is selected to prevent contact with the wall of input tank 16. Surface equalization apparatus 100 has a desired ratio of cubic foot of media 44 and open space to allow for the desired intake and discharge rates, while controlling the lubricity rates.

Media 44 may preferably have a density ranging from 20 lbs/ft$^3$ to 90 lbs/ft$^3$, which is significantly lower than typical surface finishing media, thereby allowing a part to move inside the mass of media 44 as if the part were in a fluid; keeping media 44 between the part and the wall of input tank 16. The media 44 may be described as a fluidized bed, such that conditions allow a solid to act like a fluid; those conditions creating the fluidized bed.

While surface equalization apparatus 100 is in operation, the breakdown, or attrition rate, of the media 44 is lower when compared to conventional surface finishing machines. The slowing of the attrition rate of media 44 in surface equalization apparatus 100 can, in part, be attributed to media 44 being applied over a period of time.

Addition of media 44 during operation has cleaning and cooling properties along with providing lubricity to media 44 in the input tank 16. This addition of media 44 reduces unnecessary friction that would otherwise wear media 44 at an accelerated rate. Composite materials may be more susceptible to moisture absorption (parts are hygroscopic). The washer tank 12 may automatically add media 44 at a rate based on testing of the part.

The amplitude of the input tank 16, or more specifically a ratio of lower amplitude and higher frequency, allows for reduced attrition of the media 44. The shape of the input tank 16 is important for function. Further, the capability of tuning eccentric motor 14 from 900 to 4500 rpm allows for motion caused by eccentric motor 14 and the optimized frequency of the desired tunable ratio example of (k factor) for the requested amplitude (from 0.5 mm to 4 mm) from the springs 20 resulting in amplitude movement in input tank 16. The z-direction motion of the media 44 mass is much lower in amplitude than it would be with lower operating frequency of the drive. Surface equalization machine 100 may operate based on DC or AC current, or equivalents thereof.

The U-shaped, curved, oblong walls of the input tank 16 are essential in generating the proper motion of the media 44 in order to create a conveyor belt type of rotational flow for surface equalization, as illustrated in FIG. 5. The center of mass under fluid motion is a key factor in determining the pattern of inlet and discharge rate.

An important feature of the present disclosure is an acoustic cabinet 11 (shown in FIG. 2) surrounding input tank 16 that acoustically dampens at a spectrum of frequencies. Cabinet 11 is built in a way that allows room for the proper thickness of acoustic damping foam 18 (shown in FIGS. 4 and 5). Acoustic damping foam 18 is necessary to optimize acoustic dampening of the noise caused by input tank 16 and media 44 motion. Acoustic damping foam 18 is placed throughout the eccentric motor 14/input tank 16 cabinet. Input tank 16 is completely surrounded by acoustic damping foam 18 except for the top, open portion of the input tank 16, which is covered only by lid 13.

The ranges of frequencies of sound which are dampened are generally below 73 dBa. Input tank 16, media 44 and eccentric motor 14 cause a frequency spectrum of sound, so during the development of the present invention, an engineering study was performed to find the proper way to dampen the appropriate frequencies. The intended amplitude, in a preferred embodiment, is from 1 mm to 3 mm and frequencies from 1200 rpm to 3600 rpm in order to have a desired feed and discharge rate from 4 to 180 seconds with regard to the density volume to noise ratio.

The sound generated by operation of the device creates dissipated energy at an absorption rate, so the surface equalization apparatus 100 also has a cooling fan 34 because eccentric motor 14 generates heat, and prior vibrational based finishing devices have been known to fail due to excessive heat caused by a motor. The present disclosure uses cooling fan 34 to solve this problem, along with acoustic dampening to create sufficient dissipation of heat in order to prevent the eccentric motor 14 from failing.

Figure 6:
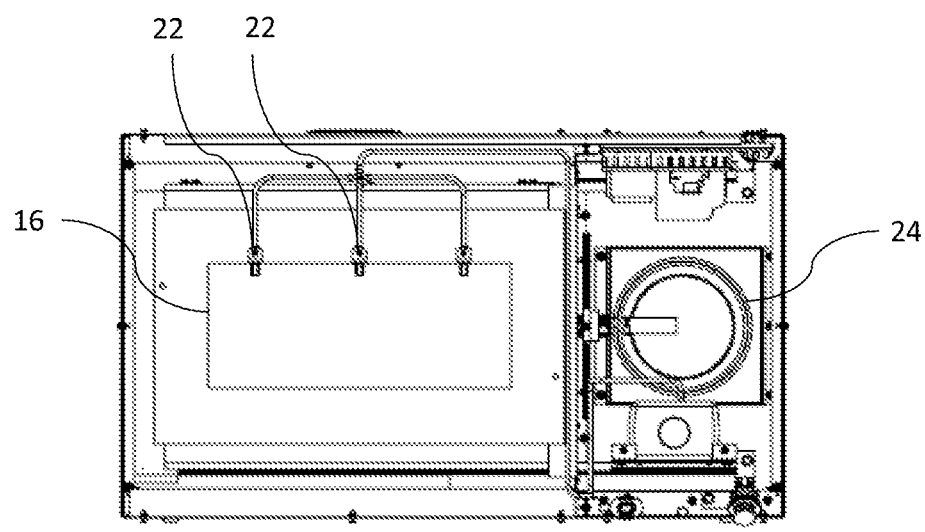
FIG. 6 shows a top view of the surface equalization apparatus in accordance with the present disclosure.

FIG. 6 shows a top view of surface equalization apparatus 100, illustrating the spatial relationship of the spray nozzles 22 to input tank 16.

Figure 7:
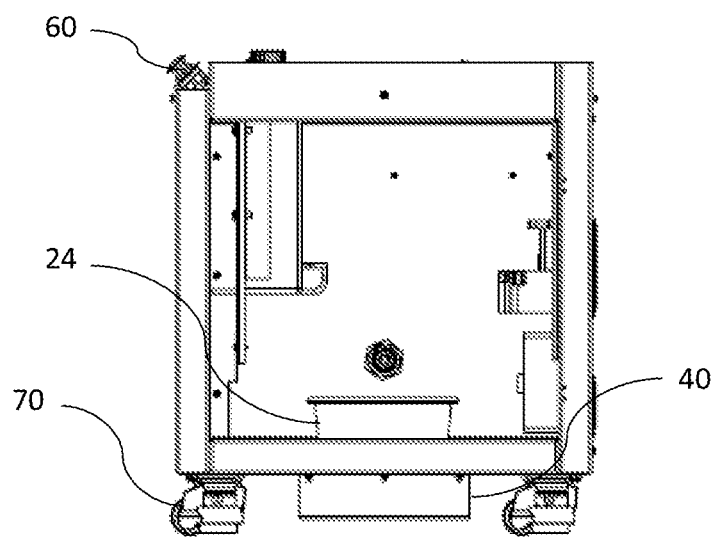
FIG. 7 shows a cross-sectional side view of the surface equalization apparatus in accordance with the present disclosure.

FIG. 7 shows a power button 60 along with wastewater removal bucket 24 and drain well 40. Further illustrated are caster wheels 70, which may be coated in urethane for noise reduction.

In some embodiments of the present disclosure there may be two recovery tanks below input tank 16. Recovery tanks collect drainage from input tank 16 and may use a weir system to separate solids from liquids. These recovery tanks have the ability to either recirculate or run on an open loop process. A hinge 35 having positive and negative resistance to hold the lid 13 in place is illustrated in FIG. 4.

In some embodiments of the present disclosure, a Beckhoff PLC/HMI provides the ability to run on an auto cycle. This system provides automatic run times, dosing, and flow control. Further, this system provides data monitoring of eccentric motor 14 frequencies, input tank 16 frequencies and amplitude, and enclosure temperature.

In some embodiments, separate spray valves allow two zones to be run with different settings at the same time, allowing for the use of different media 44 and different spray volumes and intervals.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

TABLE 1

| Media | Motor Force (lbs) | Media Volume (Gal) | Media Volume (ft^3) | Media Mass (kg) | Media Weight (lbs) | Cycle Time-RPM (sec) | Front Depth (in) | Back Depth (in) | Media Slope | Media Angle (°) | 3 ft Sound (dB) | 6 ft Sound (dB) |
|---|---|---|---|---|---|---|---|---|---|---|---|---|
| UPM | 1659 | 1 | 0.133681 | 4.4 | 9.68 | 0 | 0 | 0 | 0 | 0 | 87.1 | 79.5 |
| UPM | 1659 | 2 | 0.267362 | 8.8 | 19.36 | 5 | 0 | 0 | 0 | 0 | 82.5 | 78.5 |
| UPM | 1659 | 3 | 0.401043 | 13.2 | 29.04 | 5 | 10 | 7 | 0.3157894737 | 17.52556837 | 84.1 | 78.1 |
| UPM | 1659 | 4 | 0.534724 | 17.6 | 38.72 | 4.75 | 10 | 6 | 0.4210526316 | 22.83365418 | 83.1 | 76.7 |
| UPM | 1659 | 5 | 0.668405 | 22 | 48.4 | 4 | 8.5 | 5 | 0.3684210526 | 20.22485943 | 81.2 | 76.5 |
| UPM | 1659 | 6 | 0.802086 | 26.4 | 58.08 | 3.7 | 6.75 | 4 | 0.2894736842 | 16.14433878 | 80.1 | 75 |
| UPM | 1659 | 7 | 0.935767 | 30.8 | 67.76 | 4 | 5.5 | 3.5 | 0.2105263158 | 11.88865804 | 80 | 75 |
| UPM | 1659 | 8 | 1.069448 | 35.2 | 77.44 | 5 | 4.25 | 3 | 0.1315789474 | 7.49585764 | 78.5 | 75.5 |
| UAM | 1659 | 1 | 0.133681 | 5.1 | 11.22 | 0 | 0 | 0 | 0 | 0 | 89.9 | 83.5 |
| UAM | 1659 | 2 | 0.267362 | 10.2 | 22.44 | 4.75 | 0 | 0 | 0 | 0 | 88.5 | 81.2 |
| UAM | 1659 | 3 | 0.401043 | 15.3 | 33.66 | 4 | 10.5 | 7 | 0.3684210526 | 20.22485943 | 86.1 | 79.3 |
| UAM | 1659 | 4 | 0.534724 | 20.4 | 44.88 | 3.5 | 10 | 6 | 0.4210526316 | 22.83365418 | 84.5 | 78.6 |
| UAM | 1659 | 5 | 0.668405 | 25.5 | 56.1 | 3.25 | 9 | 4.5 | 0.4736842105 | 25.34617594 | 83.6 | 77.3 |
| UAM | 1659 | 6 | 0.802086 | 30.6 | 67.32 | 3.2 | 7 | 4 | 0.3157894737 | 17.52556837 | 82.9 | 76.5 |
| UAM | 1659 | 7 | 0.935767 | 35.7 | 78.54 | 4 | 6 | 3.5 | 0.2631578947 | 14.74356284 | 80 | 75.5 |
| UAM | 1659 | 8 | 1.069448 | 40.8 | 89.76 | 5 | 4 | 3 | 0.1052631579 | 6.009005957 | 77 | 74.9 |

I claim:

1. A method of surface smoothing an additively manufactured part, comprising:
   providing a part-containing tank having an oblong shape, wherein the part-containing tank is mounted upon springs surrounded by a top portion of the part-containing tank;
   filling the part-containing tank with a fluidized solid media;
   powering an eccentric motor which is connected to the part-containing tank at an applied angle offset from a vertical axis of the tank and imparts motion to the part-containing tank at the applied angle offset from the vertical axis of the tank to create a rotational flow of the fluidized solid media within the part-containing tank;
   placing the additively manufactured part in the part-containing tank;
   carrying the additively manufactured part in the fluidized solid media so that the additively manufactured part moves in a submerged, and circuitous motion within the part-containing tank wherein a surface of the additively manufactured part is smoothed; and
   directing the rotational flow of the fluidized solid media to prevent the additively manufactured part from contacting the part-containing tank and from reaching a surface of the fluidized solid media.

2. The method of claim 1 wherein the directing is by means of structural features that comprise at least one diverter located on and jutting inward from an inner surface of the part-containing tank.

3. The method of claim 1, further comprising adjusting a frequency of the motion generated on the part-containing tank.

4. The method of claim 1, further comprising acoustically damping sound generated.

5. The method of claim 1, further comprising adding additional fluidized solid media to the tank.

6. The method of claim 1, wherein the step of directing the rotational flow of the fluidized solid media to prevent the additively manufactured part from contacting the part-containing tank and from reaching a surface of the fluidized solid media is performed by means of guide ribs that extend along an inner side of the part-containing tank and create an inward force toward a center of the part-containing tank thereby preventing the additively manufactured part from contacting a surface of the part-containing tank.

7. The method of claim 1 wherein the motion on the part-containing tank has an amplitude of between 1 and 3 millimeters.

8. The method of claim 1 wherein the motion on the part-containing tank has a frequency of between 1200 and 1600 rpm.

9. The method of claim 1 wherein the motion on the part-containing tank has a frequency of between 900 and 4500 rpm.

10. The method of claim 1 further comprising, dampening noise caused by the part-containing tank.

11. The method of claim 1 wherein the motion on the part-containing tank is a rotational motion which causes the fluidized solid media in the part-containing tank to flow rotationally in an opposite direction.

12. The method of claim 1 wherein the fluidized solid media has a density of between 20 pounds per cubic foot and 90 pounds per cubic foot.

13. The method of claim 7 wherein the motion on the part-containing tank has a frequency of between 1200 and 1600 rpm.

14. A method of smoothing a part made by an additive manufacturing process comprising:
   causing a fluidized solid media in a tank to flow rotationally about a horizontal axis, wherein the tank is suspended from springs surrounded by a top portion of the part-containing tank and aligned to a metacentric height; and
   submersing the part made by the additive manufacturing process in the fluidized solid media in the tank so that the part made by the additive manufacturing process is carried in the fluidized solid media as the fluidized solid media flows rotationally in the tank so that the part made by the additive manufacturing process moves in a submerged, circuitous motion in the fluidized solid media in the tank; and directing flow of the fluidized solid media in the tank at a crest thereof by means of an abrasive diverter so that there is fluid movement around the part made by the additive manufacturing process thereby to maintain the part made by the additive manufacturing process underneath a surface of the fluidized solid media,
wherein a surface of the part made by the additive manufacturing process is smoothed by abrasion by the fluidized solid media.

15. The method of claim 14 further comprising creating a force on the fluidized solid media toward a center of the tank to prevent the part made by the additive manufacturing process from contacting the tank.

16. The method of claim 14 wherein the fluidized solid media is caused to flow rotationally in the tank by application of a vibratory motion to the tank.

17. The method of claim 14 wherein a surface of the fluidized solid media forms an angle during operation.

18. The method of claim 17 wherein the angle has a relationship to at least one of: a motor force, a media volume, a media mass, and a cycle time.

* * * * *